No. 897,735. PATENTED SEPT. 1, 1908.
P. GOLDBERG.
PROCESS OF FREEING WASTE WATERS CONTAINING CYANIDS
AND SULFOCYANIDS FROM POISON.
APPLICATION FILED JAN. 23, 1906.
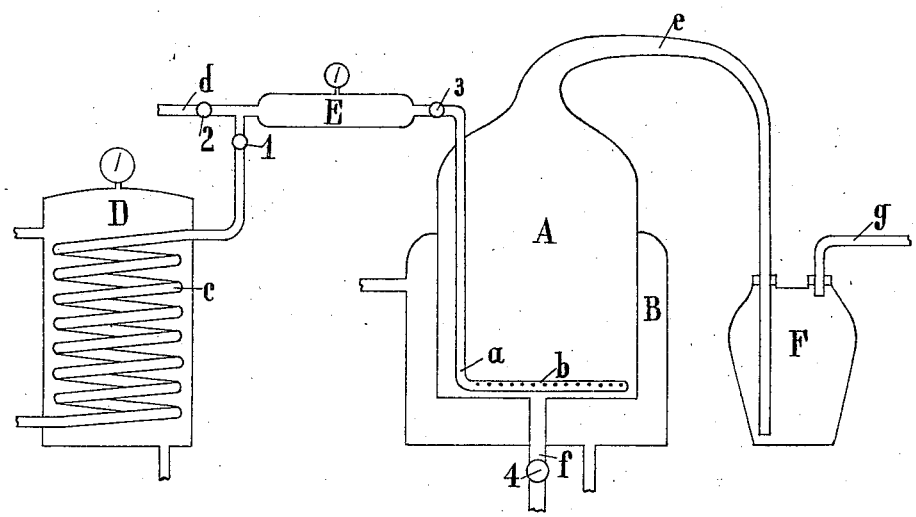
Witnesses:
Inventor
Paul Goldberg
By James L. Norris
Atty

UNITED STATES PATENT OFFICE.

PAUL GOLDBERG, OF FLÖRSHEIM-ON-THE-MAIN, GERMANY, ASSIGNOR TO THE FIRM OF CHEMISCHE FABRIK FLÖRSHEIM DR. H. NOERDLINGER, OF FLÖRSHEIM-ON-THE-MAIN, GERMANY.

PROCESS OF FREEING WASTE WATERS CONTAINING CYANIDS AND SULFOCYANIDS FROM POISON.

No. 897,735.      Specification of Letters Patent.      Patented Sept. 1, 1908.

Application filed January 23, 1906. Serial No. 297,509.

*To all whom it may concern:*

Be it known that I, PAUL GOLDBERG, chemist, a subject of the King of Prussia, residing at Flörsheim-on-the-Main, Germany, have invented certain new and useful Improvements in Processes of Freeing Waste Waters Containing Cyanids and Sulfocyanids from Poison, of which the following is a specification.

This invention has reference to a process for freeing waste liquors, solutions and other liquids containing cyano- and sulfo-cyano-compounds from poison, provision being made at the same time for obtaining hydrocyanic acid or cyanids. The process is particularly intended for the purpose of destroying the poison in the waste liquors of manufactories of ammonia, of gas-manufactories and of coking plants, in view of this kind of waste liquors being exceedingly destructive of animal and vegetable life in rivers on account of their contents of cyano- and sulfo-cyano-compounds, as well as phenols, hydrocarbons, acids, for instance formic acid, and other deleterious substances, however small a percentage this may amount to.

In carrying the process into effect, the liquids are treated according to my invention in acid solution with air, by which means the cyano-compounds are converted into hydro-cyanic acid, which latter may then be driven off and condensed.

In case of sulfo-cyanid-compounds being also present besides cyanids, an addition of corresponding amounts of oxidizing substances is made to the liquids, whereafter in this case also hydro-cyanic acid may be driven off and collected, the hydrocyanic acid being either condensed as such or being absorbed in solvents or combined by chemicals.

The accompanying drawing illustrates a vertical section of an apparatus such as may be employed in the process.

A is a still into which is inserted a pipe *a* ending in a perforated coil *b*; the pipe *a* is connected by the cylinder E with pipes *c* and *d*, having valves 1 and 2 and leading from a blowing apparatus. Another valve 3 is arranged between the cylinder E and the pipe *a*. A part of the pipe *c* is formed into a helix, which passes through a steam chamber D. The still A is fitted with a steam jacket B, an outlet *f*, and cock 4. From the neck of the still A, a pipe *e* leads into a receiver F, from thence a pipe *g* may or may not lead into more receivers.

In carrying out the process, the liquids to be purified are filled into the still A. This may be heated by means of the steam jacket B. The valve 3 is then opened and air blown through the liquid by the coil *b* and pipe *a*. This air may be previously heated; in this case the valve 1 is opened, valve 2 being closed, so that the air passes through the heated spiral pipe *c*, or cold air may be used by closing the valve 1, opening 2, and letting the air pass through *d*. Of course, hot and cold air may be mixed by opening both the valves 1 and 2. A certain pressure of air is maintained by means of the cylinder E and the valves 1, 2 and 3. The distillation-product is passed by *e* into the receiver F, which is charged with an absorbent or neutralizing agent, and from which a pipe *g* leads either to the chimney or to a second or other receivers, if this should prove necessary.

The operation of the process may be explained by the following example:—0.5 grams sulfo-cyanid of potash are dissolved in 2 liters of water and are treated with air at 50 degrees centigrade after an addition of pyrolusite and sulfuric acid having previously been made to the solution. The hydro-cyanic acid which was carried off with the air, was absorbed in caustic potash solution forming cyanid of potash. In the residue neither hydro-cyanic acid nor sulfo-cyanhydric acid could be detected. In the same manner the destruction of the poison is also effected in the waste liquors left after the driving-off of the ammonia from the waste liquors of gas works treated with lime. 2 liters of this waste liquor from gas works showing a contents of about one part of sulfo-cyanid in one thousand parts, were acidified by sulfuric acid, and then treated with pyrolusite, and a current of air was then blown through the liquor at 50 degrees centigrade. The distillation product was allowed to pass into 200 cubic centimeters of standard caustic soda solution. The alkaline solution shows a very decided reaction of Prussian blue. In the residue from the distillation neither sulfo-cyanhydric acid nor hydro-cyanic acid could be detected.

By keeping the temperature down when blowing the liquor with air, the operator is at liberty to decrease the contents of water in the distillate or to regulate the same. The air may be heated or gases of combustion, for instance waste gases, may be used which possess a still higher temperature. Then, the liquors themselves may likewise be heated.

The escaping air is made to pass into receivers containing any suitable means capable of absorbing or of retaining hydrocyanic acid. Of such means the following may be mentioned:—solution of caustic alkali for the production of cyanid, solution of iron for the production of ferro-cyanid-compounds or the like. In the case of waste liquors containing only cyanids, the oxidizing additions referred to, which are necessary in the case of sulfo-cyanid-compounds, are not required. It is sufficient to acidify these liquors and to blow air through them. The waste liquors which are freed from their poisonous ingredients in this manner, may be allowed to run to waste, after having been previously neutralized, if required, by the addition of lime or of other agents for neutralizing acids.

The new process is suitable for the destruction of the poisonous constituents of waste liquors of coking plants, gas works, manufactories of ammonia and the like, as well as for the production of hydro-cyanic acid and cyanids, of ferro-cyanic-compounds and the like, from the waste liquors referred to.

From the processes heretofore known, the process hereinbefore described is distinguished by the fact of operating in acid solution in the first place and by blowing out the poisonous gases and liquors by air and then collecting the same instead of driving them off by distillation by heating directly. By this treatment with air an oxidation of the waste liquors is produced which is still increased in the presence of sulfur by the addition of oxidizing agents. It was not to be expected that comparatively small quantities of hydro-cyanic acid would resist to the action of mineral acids and of oxidizing agents on the other hand at such a high degree of dilution and that they could be carried off unchanged by blowing without being oxidized into formic acid, cyanic acid or carbonic acid, while the sulfur contents are actually oxidized in the said process.

What is claimed is:—

1. The process of purifying waste waters from ammonia-manufactories, coking plants, gas and tar manufactories and the like containing cyanids, sulfocyanids, formic acids, phenols and hydrocarbons in a very high degree of dilution, consisting in acidifying the waste waters, and in blowing a current of air through the same, whereby the poisonous compounds are driven off.

2. The process of purifying waste waters from ammonia-manufactories, coking plants, gas and tar manufactories and the like containing cyanids, sulfocyanids, formic acids, phenols and hydrocarbons in a very high degree of dilution, consisting in acidifying the waste waters, in heating the same, and in blowing a current of air through the same, whereby the deleterious compounds are driven off.

3. The process of purifying waste waters from ammonia-manufactories, coking plants, gas and tar manufactories and the like, containing cyanids, sulfocyanids, formic acids, phenols and hydrocarbons in a very high degree of dilution, consisting in acidifying the waste waters and in blowing a current of hot air through the same, whereby the poisonous compounds are driven off.

4. The process of purifying waste waters from ammonia-manufactories, coking plants, gas and tar manufactories and the like containing cyanids, sulfocyanids, formic acids, phenols and hydrocarbons in a very high degree of dilution, consisting in acidifying the waste waters, and in blowing a current of hot gases through the same, whereby the poisonous compounds are driven off.

5. The process of purifying waste waters from ammonia-manufactories, coking plants, gas and tar manufactories and the like, containing cyanids, sulfocyanids, formic acids, phenols and hydrocarbons in a very high degree of dilution, consisting in acidifying the waste waters, in adding oxidizing means to the acidified waters, and in blowing a current of air through the same, whereby the poisonous compounds are driven off.

6. The process of purifying waste waters from ammonia-manufactories, coking plants, gas and tar manufactories and the like containing cyanids, sulfocyanids, formic acids, phenols and hydrocarbons in a very high degree of dilution, consisting in acidifying the waste waters, in adding oxidizing means to the acidified waters, in heating the waters thus treated to about fifty degrees centigrade, and in blowing a current of air through the same, whereby the deleterious compounds are driven off.

In testimony whereof I have hereunto set my hand in presence of two subscribing witnesses.

PAUL GOLDBERG.

Witnesses:
OTTMAR LOEWE,
JEAN GRUND.